United States Patent Office 3,197,464
Patented July 27, 1965

3,197,464
AZIRIDINYL PHOSPHONITRILES
Gerhard F. Ottmann, Hamden, Haywood Hooks, Jr., West Haven, and Ehrenfried H. Kober and Rudi F. W. Ratz, Hamden, Conn., and Samuel S. Ristich, Patchogue, N.Y., assignors to Olin Mathieson Chemical Corporation, New York, N.Y., a corporation of Virginia
No Drawing. Filed May 18, 1962, Ser. No. 196,012
7 Claims. (Cl. 260—239)

This invention relates to aziridinyl phosphonitriles, also known as aziridinyl cyclotriphosphaza-1,3,5-trienes, and to a process for the synthesis of such compounds. More particularly, the invention relates to compounds represented by the formula (I)

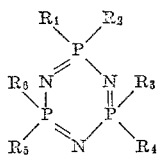

wherein each of the symbols R represents either a member of the group consisting of amino, mono-lower alkylamino and di-lower alkylamino, or an ethyleneimine group, there being at least one ethyleneimine group and at least one of the aforementioned group.

The mono- and di-lower alkylamino groups may include basic groups in which the nitrogen contains such lower alkyl groups as methyl, ethyl, propyl, isopropyl, n-butyl, t-butyl and the like. The dimethylamino group is preferred.

The compounds of Formula I are produced from trimeric phosphonitrilic chloride (II)

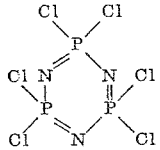

by replacing all of the chlorine atoms. The compounds of the invention may be produced by two alternate methods. According to one method, trimeric phosphonitrilic chloride, which is readily prepared by the reaction of phosphorus pentachloride and ammonium chloride, is reacted with $n$ moles of ethyleneimine in the presence of $n$ moles of a hydrogen chloride acceptor. The reaction product is then converted to an aziridinyl-aminophosphonitrile by reacting it with 6–$n$ moles of ammonia, lower alkylamine or di-lower alkylamine in the presence of 6–$n$ moles of a hydrogen chloride acceptor.

Alternatively, the procedure may be reversed and the trimeric phosphonitrilic chloride reacted with 6–$n$ moles of ammonia, lower alkylamine or di-lower alkylamine in the presence of 6–$n$ moles of hydrogen chloride acceptor. The product of this reaction is then reacted with $n$ moles of ethyleneimine in the presence of $n$ moles of hydrogen chloride acceptor to assure complete substitution of all chlorine atoms in the starting material.

The symbol "$n$" refers to any of the numbers 1, 2, 3, 4 or 5. Both approaches lead to identical compounds where $n$ represents 1 or 5, but to structural isomers when $n$ represents 2, 3 or 4. All, however, are within the scope of this invention.

Alkylamines which may be used to react with trimeric phosphonitrilic chloride include, for example, dimethylamine, diethylamine, dipropylamine and the like. Hydrogen chloride acceptors include pyridine, tertiary bases such as tertiary alkylamines, e.g. triethylamine and the like.

The reactions are carried out in a solvent, e.g. aromatic hydrocarbons such as benzene, toluene, xylene, chlorobenzene and the like, ethers such as diethylether, dioxane and the like, chlorinated hydrocarbons such as chloroform, carbon tetrachloride, trichloroethane and the like, acid amides, e.g. di-lower alkylacetamides such as dimethylacetamide, diethylacetamide etc. Reaction temperatures within the range of about −30° C. to about +120° C. may be used, but a range between 0° and 80° C. is preferred. Reaction time may vary in a range of about 2 to about 48 hours.

The compounds of this invention are useful as insect sterilizing agents. The compounds may be used to combat insects such as houseflies, screwworms, stable flies, chinch bugs, mosquitos and the like by means of conventional sprays, dusts and the like containing a minor amount, e.g. about 0.01% to about 10% by weight of the active ingredient together with an appropriate inert carrier as well as other adjuvants. The composition may be applied in the environment of the insect or on surfaces on which it may light including plants attacked by the pest. The compound may also be made up in the form of baits, i.e. by adsorption on or mixture with an attractant for the insect, for example, sucrose, glucose or the like and, if desired, together with corn meal, powdered egg or powdered milk, etc.

The following examples are illustrative of the invention. All temperatures are expressed in degrees centigrade.

EXAMPLE 1

2-(aziridinyl)-2,4,4,6,6-pentakis(dimethylamino) phosphonitrile

A flask equipped with stirrer, drying tube, and thermometer is charged with a solution of 34.8 grams of trimeric phosphonitrilic chloride in 1200 milliliters of ether. The solution is cooled to −30° C. and 4.3 grams of ethyleneimine and 10.1 grams of triethylamine in 250 milliliters of ether are added dropwise over a period of 70 minutes. Stirring at −30° C. is continued for several hours. The reaction mixture is allowed to warm slowly to room temperature. After removal of 14 g. of triethylamine hydrochloride, the solution is concentrated to dryness in vacuo at 20° C. yielding 34.4 grams of crude product which is purified by fractional recrystallization from 50 milliliters of hexane. 8.4 grams of pure mono (aziridinly)pentachlorocyclotriphosphaza - 1,3,5 - triene, M.P. 71–72° C., are obtained.

Analysis.—Calcd. for $C_2H_4Cl_5N_4P_3$: C, 6.8%; H, 1.14%; N, 15.8%; Cl, 50.0%. Found: C, 7.13%, 6.90%; H, 1.33%, 1.28%; N, 15.60%, 15.83%; Cl, 50.07%.

15.3 grams of (aziridinyl)-pentachlorophosphonitrile are dissolved in 100 milliliters of benzene and a solution of 19.4 grams of dimethylamine in 50 milliliters of benzene is added over a period of 75 minutes at 20–25° C. After standing for three days at room temperature and for 15 hours at 50–55° C., dimethylamine hydrochloride (17.2 grams) is collected. 16 grams of reaction product remains after the removal of benzene in vacuo at room temperature. The waxy residue is recrystallized from 12 milliliters of hexane and the precipitate is dried on a porous plate. Vacuum sublimation (90–100° C. bath temperature) and one final recrystallization from dimethylformamide gives the pure compound, M.P. 80–80.5° C.; yield: 3.7 grams.

Analysis.—Calcd. for $C_{12}H_{34}N_9P_3$: C, 36.3%; H, 8.6%; N, 31.8%. Found: C, 35.99%, 36.08%; H, 8.0%, 7.8%; N, 32.2%, 32.4%.

EXAMPLE 2

2,2-bis(aziridinyl)-4,4,6,6-tetrakis(dimethylamino) phosphonitrile 34.8 grams (0.1 mole) of $(PNCl_2)_3$ are dissolved in 150 milliliters of dry toluene and a solution, consisting of 8.6 grams (0.2 mole) of ethyleneimine and 20.2 grams (0.2 mole) of triethylamine in 150 milliliters of toluene, is added dropwise, with stirring, over a period of 1.25 hours. A reaction temperature of 35–38° C. is maintained during the addition and then stirring is continued overnight at room temperature. Triethylamine hydrochloride is removed by filtration (31.6 grams) and the filtrate is concentrated in vacuo until heavy crystallization occurs. The crystals are collected and dried, yielding 20.5 grams (57% of the theory) of 2,2-bis(aziridinyl) tetrachlorocyclotriphosphaza-1,3,5-triene, [2,2-bis(aziridinyl)-tetrachlorophosphonitrile], M.P. 104–105° C. Recrystallization from 60 milliliters of hexane raises the melting point to 105–106° C.

*Anal.*—Calcd. for $C_4H_8Cl_4N_5P_3$: C, 13.29%; H, 2.21%; N, 19.39%. Found: C, 12.90%; H, 2.27%; N, 19.21%.

A solution of 28 grams of anhydrous dimethylamine in 300 milliliters of ether is added dropwise to a solution of 25 grams of 2,2-bis(aziridinyl)tetrachloro-phosphonitrile (M.P. 105–106° C.) in 200 milliliters of ether over a period of 30 minutes at a temperature of 5 to 10° C. After the addition is completed, the ice bath is removed and stirring continued for four more hours. Dimethylamine hydrochloride (11.7 grams) is filtered off and the filtrate freed from ether. The residue is dissolved in 200 milliliters of benzene and 28 grams of dimethylamine are added. This mixture is heated in an autoclave for three hours at 80° C. An additional 10.2 grams of dimethylamine hydrochloride is separated and the solution is concentrated to dryness. The residue (26.6 grams of crude product) is recrystallized three times from 35 milliliters, 30 milliliters, and 25 milliliters, each of n-hexane, respectively. Yield: 9.2 grams of pure 2,2-bis(aziridinyl)-4,4,6,6-tetrakis(dimethylamino)phosphonitrile, M.P. 93° C.

*Anal.*—Calcd. for $C_{12}H_{32}N_9P_3$: C, 36.5%; H, 6.52%; N, 31.9%; Cl, 0. Found: C, 36.31%; H, 8.52%; N, 31.89%; Cl, 0.09%.

EXAMPLE 3

*2,4,6-tris(dimethylamino)-2,4,6-trichlorophosphonitrile*

A solution of 34.8 grams (0.1 mole) of trimeric phosphonitrilic chloride in 300 milliliters of ether and 155 grams (0.86 mole) of a 25% aqueous solution of dimethylamine are cooled and combined in an autoclave. After stirring for 30 to 40 minutes, the ether phase is separated, dried with $CaCl_2$ and distilled. The remaining oil crystallizes in silky needles which eventually requires several days. The crystals are freed from oil by spreading on a porous plate and then recrystallized from n-heptane. The pure material melts at 105–106° C.

*Anal.*—Calcd. for $C_6H_{18}Cl_3N_6P_3$: C, 19.3%; H, 4.8%; N, 22.5%. Found: C, 19.05%; H, 5.3%; N, 22.54%.

EXAMPLE 4

*2,4,6-tris(aziridinyl)-2,4,6-tris(dimethylamino) phosphonitrile*

A solution of 18.7 grams of 2,4,6-tris(dimethylamino) 2,4,6-trichlorophosphonitrile in 50 milliliters of toluene is added dropwise, with stirring, to a solution of 9.7 grams of ethyleneimine and 22.75 grams of triethylamine in 100 milliliters of toluene. The reaction is exothermic causing a temperature increase from 25° to 38° C. After stirring at room temperature for 18 hours, 8.3 grams of triethylamine hydrochloride is removed by filtration. The filtrate is concentrated in vacuo until no toluene and triethylamine is left. The oily residue is treated with fresh ethyleneimine (9.7 grams), triethylamine (22.75 grams), and toluene (150 milliliters) for two hours under reflux conditions. An additional amount of 13.5 grams of triethylamine hydrochloride forms and is removed by filtration. Upon concentration in vacuo the filtrate yields an oil which crystallizes to about 50% after several days. After removing the oily part by means of a porous plate, 8.35 grams of crystalline material is obtained. Two crystallizations from n-pentane (35 milliliters) affords 5.5 grams of 2,4,6-tris(aziridinyl)-2,4,6-tris(dimethylamino) phosphonitrile, M.P. 83–84° C.

*Anal.*—Calcd. for $C_{12}H_{30}N_9P_3$: C, 36.65%; H, 7.65%; N, 32.1%; Cl, 0. Found: C, 35.68%; H, 7.92%; N, 32.08%; Cl, 0.46%.

EXAMPLE 5

*2,2,4-tris(aziridinyl)-4,6,6-tris(dimethylamino) phosphonitrile*

A solution of 26 grams of ethyleneimine and 61 grams of triethylamine in 200 milliliters of ether are added dropwise over a period of 5.5 hours to 69.6 grams of trimeric phosphonitrilic chloride in 400 milliliters of ether. After standing overnight, 85 grams of triethylamine hydrochloride are collected and the ether solution is concentrated in vacuo yielding 70 grams of a glass-like residue which, upon recrystallization from ethanol, form a semicrystalline solid.

The crude, glassy reaction product is broken up and extracted with four 250 milliliters portions of ether.

The combined ether extracts are filtered and evaporated in vacuo to dryness leaving 49 grams of a tacky, semisolid which is shaken with 200 milliliters of $CCl_4$. After standing for one day in a refrigerator, the solution turns into a paste of silky needles of tris(aziridinyl)trichlorophosphonitrile. The crystals are separated by filtration, dried on a porous plate and recrystallized several times from carbon tetrachloride. Yield: 12 grams of pure 2,2,4-tris(aziridinyl)trichlorophosphonitrile, M.P. 172° C. (with polymerization).

*Anal.*—Calcd. for $C_6H_{12}Cl_3N_6$: C, 19.58%; H, 3.29%; N, 22.9%; Cl, 29.0%. Found: C, 20.01%; H, 4.5%; N, 23.07%; Cl, 29.2%.

A solution of 7.8 grams of dimethylamine in 50 milliliters of ether is added to a solution consisting of 9.7 grams of 2,2,4-tris(aziridinyl)trichlorophosphonitrile, 600 milliliters of ether, and 500 milliliters of benzene. After standing for 24 hours at room temperature, 4.6 grams of dimethylamine hydrochloride are obtained. The solution is worked up as in Example 2. The total reaction product, amounting to 8.3 grams, is recrystallized several times from n-heptane and n-hexane. Yield: 4.5 grams, M.P. 178.5–180° C.

EXAMPLE 6

*4,6-bis(dimethylamino)2,2,4,6-tetrachlorophosphonitrile*

An ice-cold solution of 77.4 grams of 25% aqueous dimethylamine (0.43 mole) is added all at once to a cooled solution of 34.8 grams (0.1 mole) of trimeric phosphonitrilic chloride in 300 milliliters of ether in an autoclave. The vessel is closed immediately and the contents are stirred for 20 minutes. The temperature rises as high at 38° C. From the reaction mixture the ethereal solution is separated, dried over $CaCl_2$, and distilled. The remaining oil crystallizes upon standing at room temperature. A 90% yield of crude solid product is obtained (adhering oil is removed by spreading on a porous plate). After two recrystallizations from 100 milliliters of heptane, a 66% yield of pure 4,6-bis(dimethylamino)2,2,4,6 - tetrachlorophosphonitrile, M.P. 102° C., is attained.

*Anal.*—Calcd. for $C_4H_{12}Cl_4N_5P_3$: C, 13.1%; H, 3.3%; N, 19.05%. Found: C, 12.20%, 13,13%; H, 3.71%; N, 19.20%; N, 19.33%.

EXAMPLE 7

*4,6-bis(diethylamino)-2,2,4,6-tetrachlorophosphonitrile*

By substituting diethylamine for dimethylamine in the procedure of Example 6, 4,6-bis(diethylamino)-2,2,4,6-tetrachlorophosphonitrile, M.P. 134° C., is produced.

EXAMPLE 8

*2,2,4,6-tetrakis(aziridinyl)-4,6-bis(dimethylamino) phosphonitrile*

To 18.05 grams of ethyleneimine and 40.4 grams of triethylamine in 200 milliliters of toluene is added a solution of 36.5 grams of 4,6-bis(dimethylamino)-2,2,4,6-tetrachlorophosphonitrile in 100 milliliters of toluene, with stirring and cooling by means of tap water. After stirring overnight, 33 grams of triethylamine hydrochloride are removed and the filtrate refluxed for three hours, thus precipitating an additional amount of 8.5 grams of $(C_2H_5)_3N\cdot xHCl$. Toluene is removed from the clear solution by distillation in vacuo. The remaining residue is dissolved in 100 milliliters of fresh toluene and treated with a solution consisting of 150 milliliters of toluene, 12 grams of ethyleneimine and 27 grams of triethylamine. After stirring for two days at room temperature and two hours at reflux temperature, triethylamine hydrochloride (15 grams) is removed and toluene distilled off. The oily reaction product crystallizes partly upon standing at ambient temperature. The crystals are separated in a waxy state and subjected to a fractional crystallization from hexane, and, finally, from heptane. The yield of pure 2,2,4,6 - tetrakis(aziridinyl) - 4,6-bis(diethylamino) phosphonitrile, M.P. 101.5–102.5° C., amounts to 3.75 grams (10 percent).

*Anal.*—Calcd. for $C_{12}H_{28}N_9P_3$: C, 36.8%; H, 7.16%; N, 32.30%; P, 23.8%. Found: C, 36.35%; H, 7.31%; N, 32.24%; P, 23.8%.

EXAMPLE 9

*2,2,4,6-tetrakis(aziridinyl)-4,6-bis(diethylamino) phosphonitrile*

By substituting 4,6-bis(diethylamino)2,2,4,6-tetrachlorophosphonitrile for the starting material in Example 8, the corresponding bis(diethylamino) product is formed.

EXAMPLE 10

*2,2,4,4-tetrakis(aziridinyl)-6,6-bis(dimethylamino) phosphonitrile*

To 32.6 grams of 2,2-bis(aziridinyl)tetrachlorophosphonitrile in 250 milliliters of benzene is added dropwise a solution of 7.8 grams of ethyleneimine and 18.6 grams of triethylamine in 100 milliliters of benzene over a period of 90 minutes, with stirring. The solution is allower to remain for 18 hours at 20° C. before 24.1 grams of triethylamine hydrochloride is removed. The filtrate is concentrated in vacuo and the residue recrystallized from $CCl_4$ and then twice from heptane. Yield: 11.7 grams of 2,2,4,4, - tetrakis(aziridinyl)-6,6-dichlorocyclotriphosphaza - 1,3,5 - triene, [2,2,4,4-tetrakis(aziridinyl)-6,6-dichlorophosphonitrile], M.P. 128–129° C.

*Anal.*—Calcd. C, 25.6%; H, 4.31%; N, 26.2%. Found: C, 25.90%, 25.80%; H, 4.68%, 4.61%; N, 26.48%; 26.27%.

6.0 grams of dimethylamine in 50 milliliters of ether are added to an ice-cooled solution of 11.84 grams of 2,2,4,4, - tetrakis(aziridinyl)-6,6-dichlorophosphonitrile in 1000 milliliters of ether. After 15 hours, the ether solution is concentrated to a volume of 250 milliliters and 6.0 grams of dimethylamine in 250 milliliters of benzene are added at 15° C. After 24 hours, a total of 5.3 grams of dimethylamine hydrochloride are separated by filtration. The filtrate renders upon concentration 12.4 grams of the crude phosphonitrile which, after being purified by recrystallization from n-hexane, shows a melting point of 131–132° C.

*Anal.*—Calcd. for $C_{12}H_{28}N_9P_3$: C, 36.9%; H, 7.22%; N, 32.3%. Found: C, 36.7%; H, 6.91%; N, 32.37%.

EXAMPLE 11

*2,2,4,6-tetrakis(aziridinyl)-4,6-bis(methylamino) phosphonitrile*

The substitution of methylamine in the procedure of Example 6 gives 4,6 - bis(methylamino) - 2,2,4,6-tetrachlorophosphonitrile, which by the procedure of Example 8, yields 2,2,4,6 - tetrakis(aziridinyl) - 4,6 - bis(methylamino)phosphonitrile.

EXAMPLE 12

*2,2,4,4,6-pentakis(aziridinyl)-6-(dimethylamino) phosphonitrile*

A solution consisting of 64.4 grams of ethyleneimine, 151.2 grams of triethylamine, and 450 milliliters of ether is added dropwise over a period of 4 hours to a stirred solution of 104 grams of $(PNCl_2)_3$ in 1200 milliliters of ether. A tap water bath is applied to keep the reaction temperature between 20° and 25° C. Stirring is continued overnight to complete the reaction. The precipitate formed is removed by filtration (225.5 grams) and extracted by ether until all ether-soluble parts are removed. The ether extract is concentrated to dryness in vacuo yielding 35 grams of crude 2,2,4,4,6-pentakis(aziridinyl) - monochloro-cyclotriphosphaza-1,3,5-triene, M.P. 115–117° C. After two recrystallizations from n-heptane the melting point is raised to 121.5–122.5° C.

*Anal.*—Calcd. for $C_{10}H_{20}ClN_8P_3$: C, 31.55%; H, 5.3%; N, 29.45%; Cl, 9.31%. Found: C, 31.7%; H, 5.7%; N, 29.15%; Cl, 9.69%.

To a solution of 5.6 grams of 2,2,4,4-pentakis(aziridinyl)-6-chlorophosphonitrile in 100 milliliters of benzene is added a solution consisting of 1.2 grams of dimethylamine, 4.0 grams of triethylamine, and 25 milliliters of benzene within 10 minutes. Precipitation begins 15 minutes after addition and continues slowly during the next 24 hours. Only 55 percent of the triethylamine hydrochloride expected separates, while the other 45 percent remains in solution. After six days of standing, the reaction mixture is worked-up by the procedure of Example 10. The final purification—recrystallization from n-heptane—gives pure 2,2,4,4,6 - pentakis(aziridinyl)-6-(dimethylamino)phosphonitrile, M.P. 116–117.5° C.

*Anal.*—Calcd. for $C_{12}H_{26}N_9P_3$: C, 37.1%; H, 6.74%; N, 32.4%. Found: C, 37.22%; H, 6.45%; N, 32.05%, 32.09%.

EXAMPLE 13

*2,2,4,6-tetrakis(aziridinyl)-4,6-bis(di-n-butylamino) phosphonitrile*

The substitution of di-n-butylamine for the dimethylamine in the procedure of Example 6 and then processing further as in Example 8 yields 2,2,4,6-tetrakis(aziridinyl)-4,6-bis(di-n-butylamino)phosphonitrile.

EXAMPLE 14

*2,2,4,6-tetrakis(aziridinyl)-4,6-diaminophosphonitrile*

By following in general the procedure of Example 6, but stirring an ethereal solution of phosphonitrilic chloride with concentrated aqueous ammonia, 4,6-diamino-2,2,4,6-tetrachlorophosphonitrile is produced. The layers are then separated and the product is recovered from the ether layer. Recrystallization from benzene gives the pure product, M.P. 165° C.

Further processing as in Example 8 gives 2,2,4,6-tetrakis(aziridinyl)-4,6-diaminophosphonitrile.

A reversal of the steps, i.e. when ethyleneimine is reacted first and the ammonia is reacted with the reaction product, the isomeric 4,4,6,6-tetrakis(aziridinyl)-2,2-diaminophosphonitrile is obtained.

EXAMPLE 15

*4,4,6,6-tetrakis(aziridinyl)-2,2-bis(methylamino) phosphonitrile*

By reversing the order of reaction in Example 11, i.e. reacting ethyleneimine first, then using methylamine, the isomeric 4,4,6,6-tetrakis(aziridinyl)-2,2-bis(methylamino)-phosphonitrile is obtained.

EXAMPLE 16

0.5 gm. of 2,4,6-tris(aziridinyl)-2,4,6,-tris(dimethylamino)-phosphonitrile are dissolved in 40 ml. of chloroform. This blended with 100 gm. of granular sucrose. The resulting slurry is stirred until the chloroform has evaporated. The dried bait thus formed having a concentration of 0.5% of active sterilant is then reground in a mortar and may be used as insect bait, e.g. for houseflies (*Musca domestica*).

EXAMPLE 17

0.5 gm. of 2,2,4,6-tetrakis(aziridinyl)-4,6-bis(dimethylamino)-phosphonitrile are dissolved in 100 ml. of water. Three drops of a 5% Tween 20 surfactant solution are added and stirred. This 0.5% solution is used as a spray applied to insects.

EXAMPLE 18

*Pentakis(1-aziridinyl)monoaminophosphonitrile*

In a 500 ml. three-necked flask, equipped with condenser, stirrer and gas inlet tube, 200 ml. of anhydrous chloroform are saturated at room temperature with anhydrous ammonia. After addition of 21.5 g. ethyleneimine (0.5 mole) the gas inlet tube is replaced by a dropping funnel. A solution of 34.8 g. trimeric phosphonitrilic chloride (0.1 mole) in 150 ml. of chloroform is added dropwise with stirring to the ammonia/ethyleneimine solution with external ice-cooling over a period of 40 minutes. After this addition is completed, the mixture is stirred for one additional hour at room temperature and finally allowed to stand overnight. Almost the theoretical amount of ammonium chloride (26.7 g.) is separated by filtration. The chloroform is removed from the filtrate by distillation, the somewhat sticky residue is kept for 6 hours under a 1 mm. vacuum. The almost colorless material loses its remaining stickiness upon treatment with 100 ml. of ether, resulting in 25.5 g. of a dry powder. The crude material is recrystallized first from carbon tetrachloride and finally from a small amount of dimethylacetamide. Yield on pure material: 11 g. (31%), M.P. 132/133° C.

*Anal.*—Calcd. for $C_{10}H_{22}N_9P_3$: C, 33.30%; H, 6.10%; N, 34.95%; P, 24.75%. Found: C, 33.31%, 33.69%; H, 6.20%, 6.25%; N, 35.22%, 35.31%; P, 25.55%, 25.62%.

What is claimed is:

1. A compound of the formula

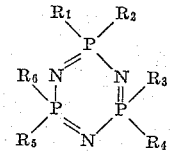

wherein $R_1$, $R_2$, $R_3$, $R_4$, $R_5$ and $R_6$ each is a member of the group consisting of amino, lower alkylamino, di-lower alkylamino and ethyleneimine, at least one ethyleneimine group and one member of the group consisting of amino, lower alkylamino and di-lower alkylamino being present.

2. Aziridinyl-di(lower alkylamino)phosphonitrile.
3. Aziridinyl-pentakis(dimethylamino)phosphonitrile.
4. Bis(aziridinyl) - tetrakis(dimethylamino)phosphonitrile.
5. Tris(aziridinyl)-tris(dimethylamino)phosphonitrile.
6. Tetrakis(aziridinyl) - bis(dimethylamino)phosphonitrile.
7. Pentakis(aziridinyl)-(dimethylamino)phosphonitrile.

References Cited by the Examiner

UNITED STATES PATENTS

| | | | |
|---|---|---|---|
| 2,606,900 | 8/52 | Parker et al. | 260—239 |
| 2,670,347 | 2/54 | Kuh et al. | 260—239 |
| 2,858,306 | 10/58 | Ratz et al. | 260—239 |
| 2,859,134 | 11/58 | Reeves et al. | 260—239 |
| 2,886,539 | 5/59 | Drake et al. | 260—239 |
| 3,113,129 | 12/63 | Ratz | 260—239 |

OTHER REFERENCES

Audrieth, Records of Chemical Progress, volume 20, No. 2, June 1959, page 61.

Becke-Geohring et al., Zeitschrift Fur Anorganische und Allegemeine Chemie, volume 302, pages 103–120 (1959).

Jackson et al., Brit. J. Pharmacol. (1959), volume 14, pages 149–157.

La Brecque, J. Econ. Entomology, volume 54, pages 684–689 (1961).

NICHOLAS S. RIZZO, *Primary Examiner.*

IRVING MARCUS, WALTER A. MODANCE, *Examiners.*